(12) United States Patent
Szarski et al.

(10) Patent No.: US 10,139,806 B2
(45) Date of Patent: Nov. 27, 2018

(54) SYSTEMS AND METHODS FOR COORDINATE TRANSFORMATION USING NON-DESTRUCTIVE IMAGING

(71) Applicant: The Boeing Company, Chicago, IL (US)

(72) Inventors: Martin A. Szarski, Canterbury (AU); David M. Bain, Ashburton (AU); Phillip J. Crothers, Hampton East (AU)

(73) Assignee: The Boeing Company, Chicago, IL (US)

( * ) Notice: Subject to any disclaimer, the term of this patent is extended or adjusted under 35 U.S.C. 154(b) by 814 days.

(21) Appl. No.: 14/594,282

(22) Filed: Jan. 12, 2015

(65) Prior Publication Data

US 2016/0202689 A1   Jul. 14, 2016

(51) Int. Cl.
*G05B 19/4097* (2006.01)

(52) U.S. Cl.
CPC ........... *G05B 19/4097* (2013.01); *G05B 2219/37443* (2013.01); *Y10S 901/41* (2013.01)

(58) Field of Classification Search
CPC ...... G05B 19/4097; G05B 2219/37443; Y10S 901/41
See application file for complete search history.

(56) References Cited

U.S. PATENT DOCUMENTS

| | | | | |
|---|---|---|---|---|
| 5,414,647 A | * | 5/1995 | Ebenstein | G01B 11/24 382/195 |
| 6,041,132 A | * | 3/2000 | Isaacs | G01N 23/046 378/21 |
| 6,470,587 B1 | * | 10/2002 | Cunningham | G01B 5/0025 33/549 |
| 6,502,249 B2 | * | 1/2003 | Cunningham | G01B 5/0025 2/338 |
| 6,711,293 B1 | | 3/2004 | Lowe | |
| 6,922,599 B2 | * | 7/2005 | Richey | G05B 19/4097 700/97 |
| 7,605,929 B2 | * | 10/2009 | Erfling | G01B 11/026 356/625 |
| 7,671,999 B2 | * | 3/2010 | Erfling | G01B 11/024 356/601 |

(Continued)

*Primary Examiner* — Abdelmoniem I Elamin
(74) *Attorney, Agent, or Firm* — Miller, Matthias & Hull LLP

(57) ABSTRACT

Systems and methods for generating a coordinate transformation are disclosed. The system can include a non-destructive imaging (NDI) device for detecting the location of local surface and subsurface features in an object (e.g., an aircraft). The system can compare the location of these local features to the location of features from engineering drawings (e.g., CAD files) to generate a coordinate transformation from a machine coordinate system, for example, to an absolute coordinate system. The system can then accurately locate a work piece to perform repairs or replacements, as necessary. The system can also include a robotic arm to enable repairs to be performed at reduced cost and with increased accuracy. The system can also compare two or more NDI scans to locate or relocate a machine that has been moved. This can enable the machine to be repositioned for repairs, maintenance, or to perform a two part repair.

37 Claims, 12 Drawing Sheets

(56) References Cited

U.S. PATENT DOCUMENTS

| | | | |
|---|---|---|---|
| 2008/0012851 A1* | 1/2008 | Bae | G06T 17/00 |
| | | | 345/419 |
| 2009/0015846 A1* | 1/2009 | Erfling | G01B 11/024 |
| | | | 356/602 |
| 2012/0290130 A1* | 11/2012 | Kapoor | B25J 9/1671 |
| | | | 700/247 |
| 2013/0028478 A1* | 1/2013 | St-Pierre | G01B 11/002 |
| | | | 382/103 |
| 2016/0363791 A1* | 12/2016 | Lee | G01N 21/95 |

* cited by examiner

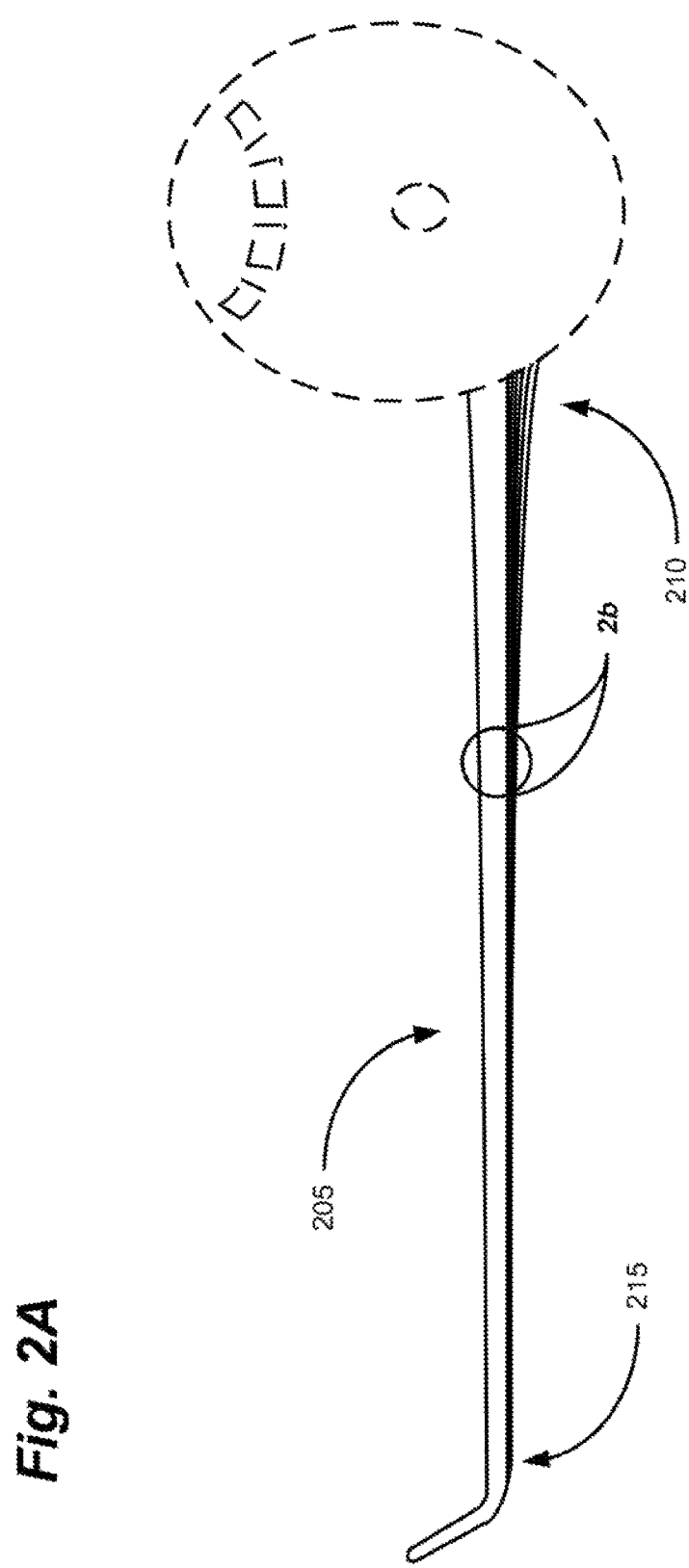

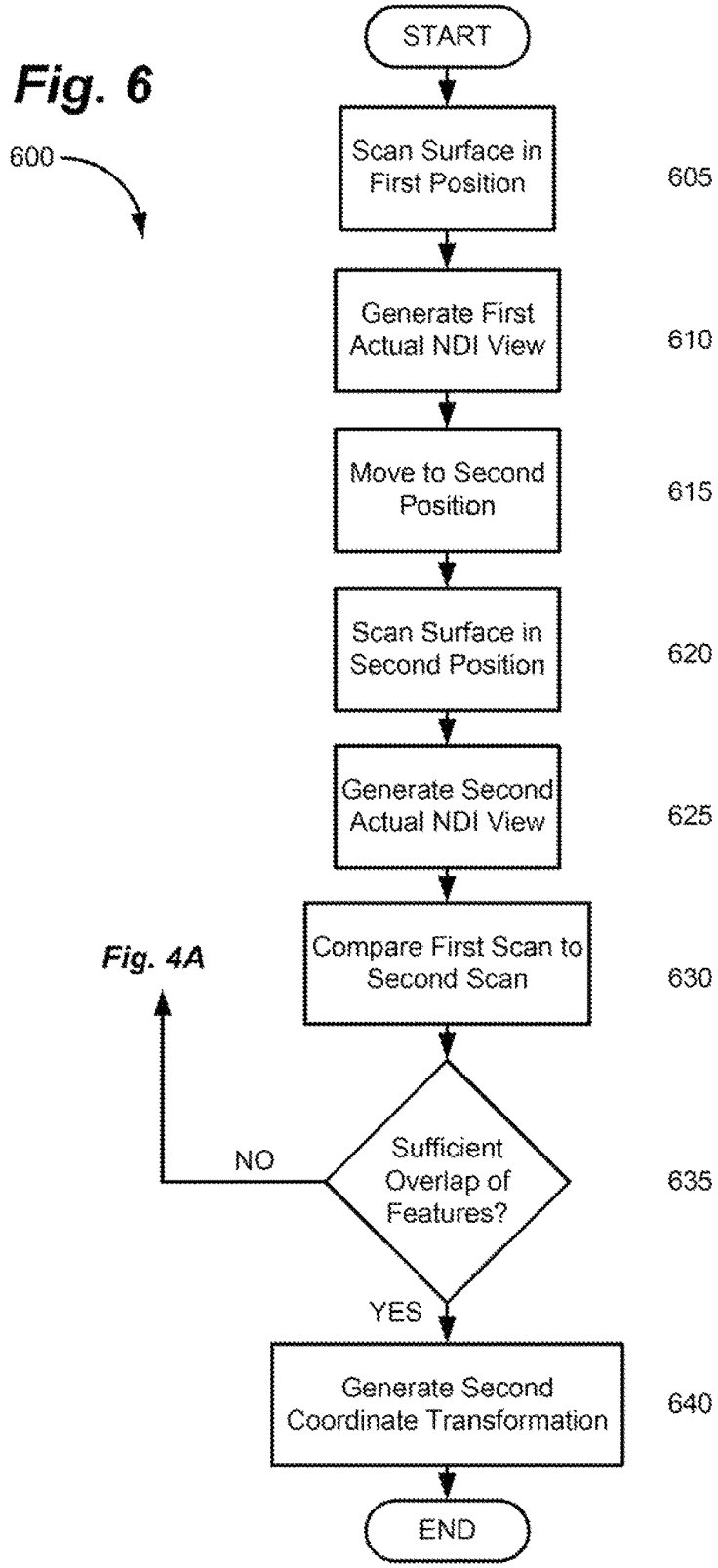

SYSTEMS AND METHODS FOR COORDINATE TRANSFORMATION USING NON-DESTRUCTIVE IMAGING

FIELD

Embodiments of the present disclosure relate generally to robotic machining and specifically to guiding robotic machining using local subsurface features.

BACKGROUND

Robots and other computer controlled machines are widely used in manufacturing. Robots are often used, for example, to perform repetitive tasks that require a high level of precision. Robots are used on vehicle assembly lines to perform welding operations, install glass, and even install valve seats in high performance engines.

Robots are useful in many of these roles because the part involved can be precisely positioned in a repeatable manner. In other words, the robot works on the same part in the same position and thus, has a useful coordinate system to direct its movements. For a frame welding robot, for example, the frame to be welded is placed into a jig that precisely locates the frame. Thus, while the robot may have programs to weld multiple frames, the frame is nonetheless located in a jig providing a fixed coordinate system.

A problem arises, however, when the object to be machined is not in a known, fixed coordinate system, such as an aircraft sitting on the tarmac in a maintenance facility. This problem can be further exacerbated when no visible fiducials, or reference points, are available. The fuselage of an aircraft, for example, tends to be a vast expanse with few reference points with which to establish a coordinate system. Modern composite aircraft are generally manufactured in large sections and have many fewer fasteners and other reference points, for example, when compared with older, aluminum construction. This further reduces the number of available reference points.

What is needed therefore are systems and methods for accurately locating a robot in space to perform various functions. The system should use a combination of technologies to enable a robot, or other machine, to accurately locate itself on a part without the use of an absolute reference frame. It is to such systems and methods that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure can include a method for generating a coordinate transformation. In some embodiments, the method can include analyzing one or more computer aided design (CAD) files for an object and generating a synthetic non-destructive imaging (NDI) view of the object based on the CAD files. In some embodiments, the method can further include scanning one or more of a surface and a subsurface of the object with an NDI device and generating an actual NDI view of the object based on the NDI scan. By comparing the synthetic NDI view to the actual NDI view the method can then generate the coordinate transformation from a machine coordinate system to an absolute coordinate system.

Embodiments of the present disclosure can also include another method for generating a coordinate transformation. The method can include generating a synthetic non-destructive imaging (NDI) view from one or more computer aided design (CAD) files describing a first object, determining a location of one or more virtual reference points within the synthetic NDI view with a processor, scanning one or more of a surface and a subsurface of the first object with an NDI device to obtain NDI data describing the first object, generating an actual NDI view of the object based on the NDI data; and determining a location of one or more actual reference points in the NDI view. The method can also include comparing the synthetic NDI view to the actual NDI view with the processor and, using the comparison, calculate a coordinate transformation from a machine coordinate system to an absolute coordinate system with the processor.

Embodiments of the present disclosure can further include a system for generating a coordinate transformation including a robotic arm. The robotic arm can include one or more arm motors for positioning the robotic arm, one or more tool motors for positioning a tool holder on the robotic arm, and one or more machining devices for machining an object. The system can also include a first non-destructive imaging (NDI) device to generate an actual NDI view of the object, the actual NDI view including one or more actual reference points, and a processor, including one or more computer aided design (CAD) files for the object. In some embodiments, the CAD files can include one or more synthetic reference points, the processor comparing the actual NDI view and the synthetic NDI view to calculate a coordinate transformation from a machine coordinate system to an absolute coordinate system. In some embodiments, the robotic arm can perform one or more machining operations on the object using the one or more machining devices and the coordinate transformation.

Embodiments of the present disclosure can include also include method for creating a second coordinate transformation based on a first coordinate transformation. The method can include scanning one or more of a surface and a subsurface of an object with a non-destructive imaging (NDI) device in a first position for which the first coordinate transformation is known, generating a first NDI view of the object based on the NDI scan in the first position, scanning one or more of a surface and a subsurface of the object with the NDI device in a second position, and generating a second NDI view of the object based on the NDI scan in the second position. The method can then compare the first NDI view to the second NDI view and generate a second coordinate transformation from a machine coordinate system to an absolute coordinate system based on the comparison of the first NDI view to the second NDI view and the first coordinate transformation.

Embodiments of the present disclosure can further include a method for creating a coordinate transformation. In some embodiments, the method can include analyzing one or more computer aided design (CAD) files for an object and generating a synthetic non-destructive imaging (NDI) view of the object based on the CAD files. The method can also include scanning one or more of a surface and a subsurface of the object with an NDI device in a first position and generating a first NDI view of the object based on the NDI scan in the first position. The method can also include comparing the synthetic NDI view to the first NDI view and generating a first coordinate transformation from a machine coordinate system to an absolute coordinate system based on the comparison of the synthetic NDI view to the first NDI view. The method can continue by scanning one or more of a surface and a subsurface of the object with the NDI device in a second position and generating a second NDI view of the object based on the NDI scan in the second position. Then, comparing the first NDI view to the second NDI view, a second coordinate transformation can be created from a machine coordinate system to an absolute coordinate system based on the comparison of the first NDI view to the second NDI view.

Embodiments of the present disclosure can additionally include a method for creating a coordinate transformation including analyzing one or more computer aided design (CAD) files for an object and generating a synthetic non-destructive imaging (NDI) view of the object based on the CAD files. The method can also include positioning a machine on the object in a first position, scanning one or more of a surface and a subsurface of the object with an NDI device in the first position, and generating a first NDI view of the object based on the NDI scan in the first position. The method can further include comparing the synthetic NDI view to the first NDI view and generating a first coordinate transformation from a machine coordinate system to an absolute coordinate system based on the comparison of the synthetic NDI view to the first NDI view.

The method can also include positioning the machine on the object in a second position, scanning one or more of a surface and a subsurface of the object with the NDI device in the second position, and generating a second NDI view of the object based on the NDI scan in the second position. Then, by comparing the first NDI view to the second NDI view, a second coordinate transformation can be generated from a machine coordinate system to an absolute coordinate system based on the comparison of the first NDI view to the second NDI view.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 2A depicts an aircraft wing and fuselage.

FIG. 6 depicts a method for generating a coordinate transformation by comparing two actual NDI scans, in accordance with some embodiments of the present disclosure.

Figure 1:
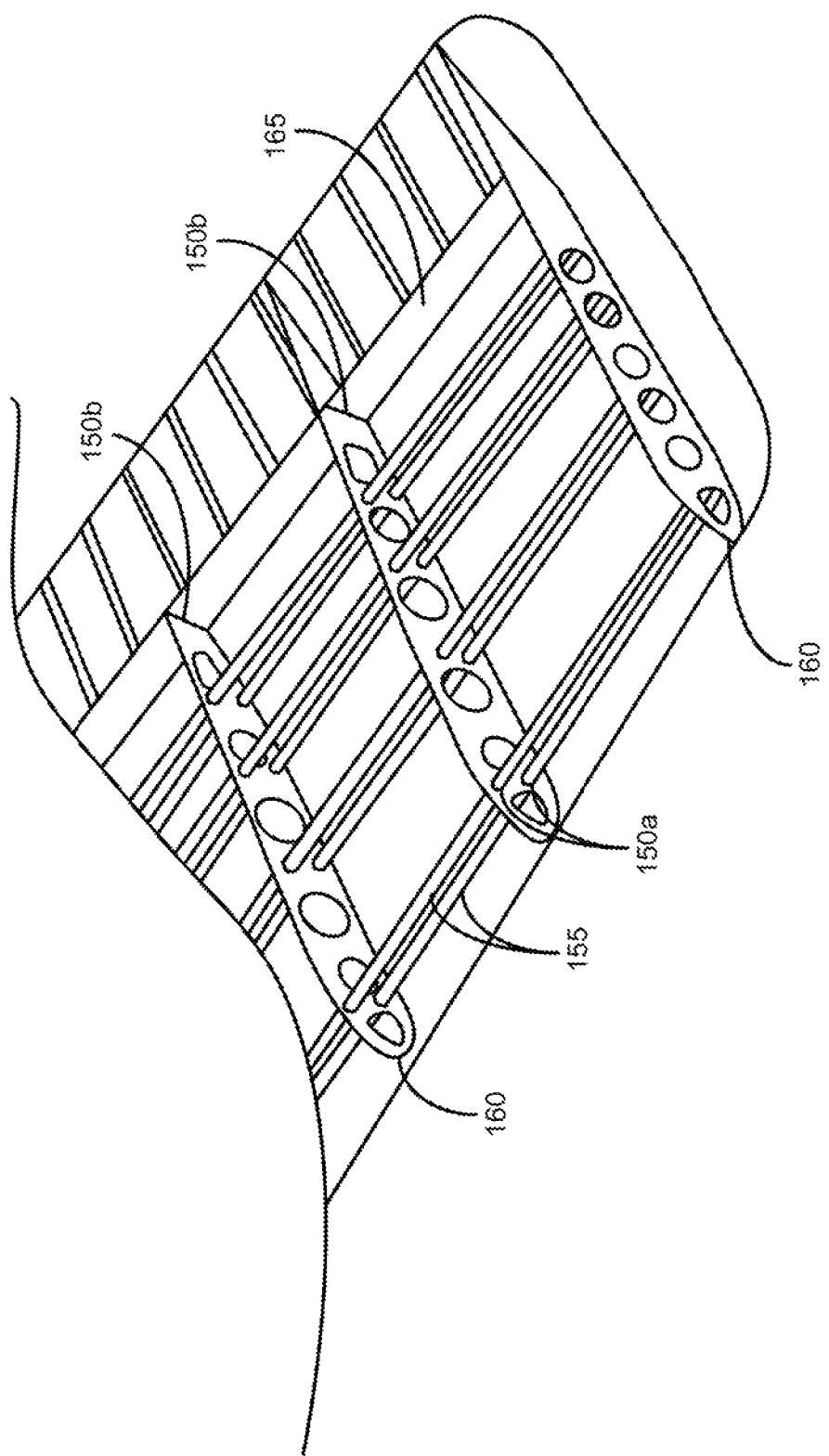
FIG. 1 is a partial, cutaway view of a wing structure from an aircraft.

Each figure shown in this disclosure shows a variation of an aspect of the embodiment presented, and only differences will be discussed in detail.

DETAILED DESCRIPTION

Embodiments of the present disclosure relate generally to robotic machining and specifically to guiding robotic machining by comparing synthetic non-destructive imaging (NDI) views with actual NDI views, or scans, of an object to locate the machine in space. In some embodiments, the system can comprise a robotic machine (e.g., a robotic arm or mobile robot) including a non-destructive imaging (NDI) device. Rather than relying solely on an absolute coordinate system, however, the robot can utilize local surface and subsurface references to accurately locate the robot and create an accurate coordinate transformation between the robot's coordinate system and an absolute coordinate system (e.g., an aircraft coordinate system). This can enable the robot to accurately locate itself despite a lack of visual references and without a known, or fixed, reference system.

To simplify and clarify explanation, the disclosure is described herein as a robot for machining and repairing aircraft. One skilled in the art will recognize, however, that the disclosure is not so limited. The system can also be used with other types of vehicles including, but not limited to, cars, motorcycles, and boats. The system can also be used, for example and not limitation, with other types of robotics, computer numerically controlled (CNC) milling and cutting machines, and other systems where high positioning accuracy is required. The system can be especially useful in operations where little or no visual references, or tooling fiducials, are available. The disclosure could also be used in conjunction with a fixed coordinate system to supplement machine accuracy.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure.

The surfaces of the wings and fuselage of large, commercial aircraft tend to comprise large expanses of relatively featureless surfaces. Even on conventional aluminum aircraft, which use vast numbers rivets and other fasteners to attach the aluminum skin to the substructures (e.g., stringers, spars, and ribs), the sheer number of fasteners may only be useful at intersections. In other words, finding a location that is 345 rivets from another location, for example, may be inaccurate, tedious, and inefficient. To compound this problem, modern, composite aircraft do not utilize as many fasteners because their skins are bonded directly to the substructure during the manufacturing process. As a result, composite aircraft are somewhat devoid of visual reference points.

FIG. 1 depicts the structure of a portion of a wing with the top skin removed. Obviously, in service much of the structure would be hidden from view by the skin of the aircraft. Using NDI, however, can enable the system to identify reference points 150 including, but not limited to, the intersection 150a of stringers 155 and ribs 160 and the intersection 150b of ribs 160 and spars 165. Each of these intersections has a nominal location in computer aided design (CAD) data, engineering drawings, and other references and thus can be used as references to locate, for example, a machining operation.

Figure 2B:
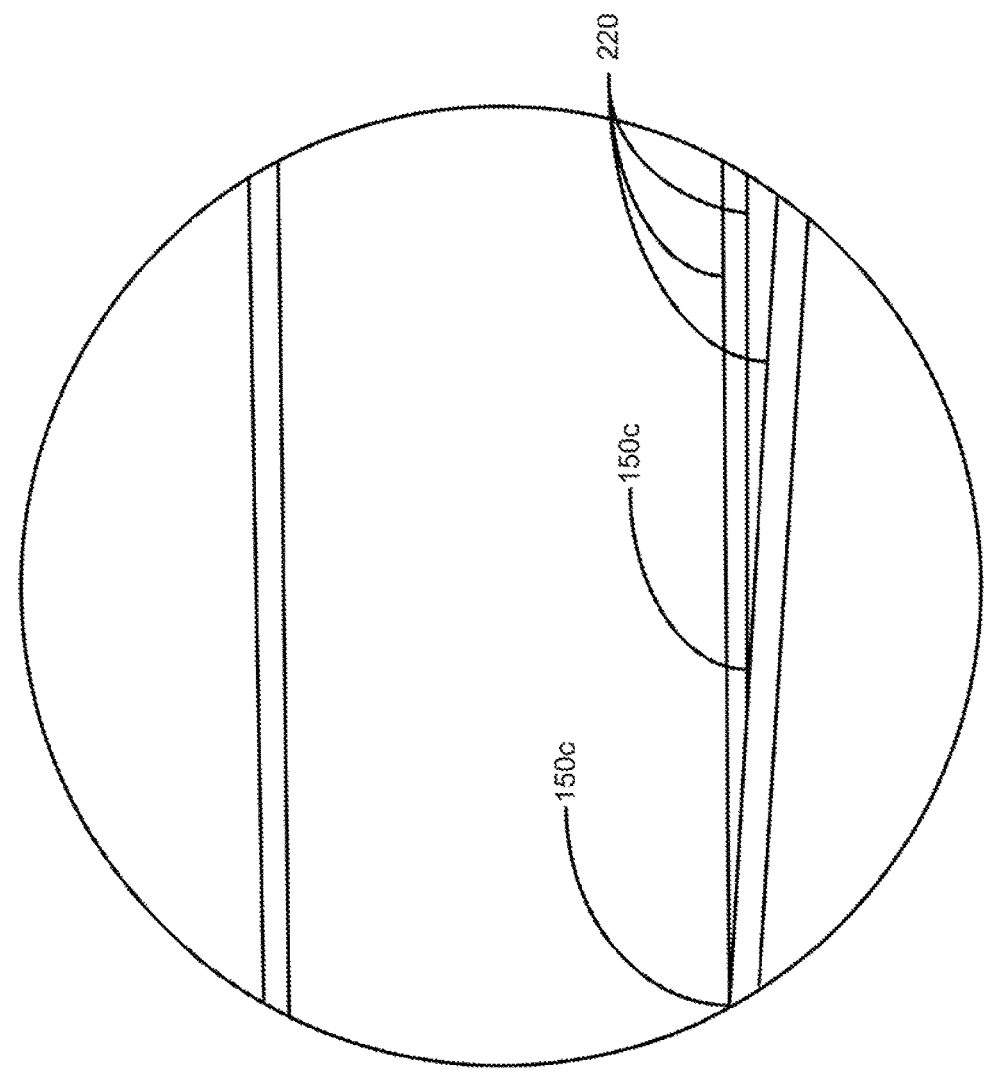
FIG. 2B is a detailed view of the aircraft wing of FIG. 2A.

In composite aircraft, additional reference points 150 can also comprise the transitions between layers of composite material in the aircraft's structure, or "ply drops." As shown in FIG. 2A, and in detail in FIG. 2B, a composite wing 205 can comprise multiple layers 220 of composite material (e.g., carbon fiber, Kevlar, etc.). In addition, the wing 205 generally tapers from root 210 to tip 215, in both chord and thickness, as the load decreases across the wing 205. As a result, the wing 205 can have additional layers 220 of material near the root 210 and fewer layers 220 near the tip 215. In some cases, additional layers 220 of material can also be used to reinforce attachment points (e.g., for the ailerons) or support points (e.g., for the fuel tanks). Each of these changes in thickness, or ply drops 150c, can also act as a reference point 150 for the system 100.

In the past, technicians have made an educated guess as to these locations and then started machining the surface of the wing, for example, hoping they were in the right position. Of course, it is only after at least the surface layer of the structure has been removed that the technician can tell whether he is in the right location or not. Unfortunately, this can result in damage to underlying layers 220 and underlying support structures and components. Using NDI, however, enables the system to locate ply drops and other references accurately with no risk of damage to the underlying structure, as discussed below.

The use of NDI enables the system to non-destructively locate thousands of reference points 150 on an object despite the object's relatively homogenous appearance. The system 100 enables the accurate location of machine tools to effect a variety of repairs and inspections. If access is required to replace an underlying component, the system can enable the component to be externally located to minimize the size and maximize the accuracy of any access holes that must be cut into the structure. This can obviate the need for workers to estimate where a component is located and take a "cut and hope" approach. If the layers 220 of material in a particular location have an anomaly (e.g., a delamination), for example, the system can enable machining to be limited to a minimal area. In some embodiments, these anomalies can also be used to further locate the machine tools.

Figure 3:
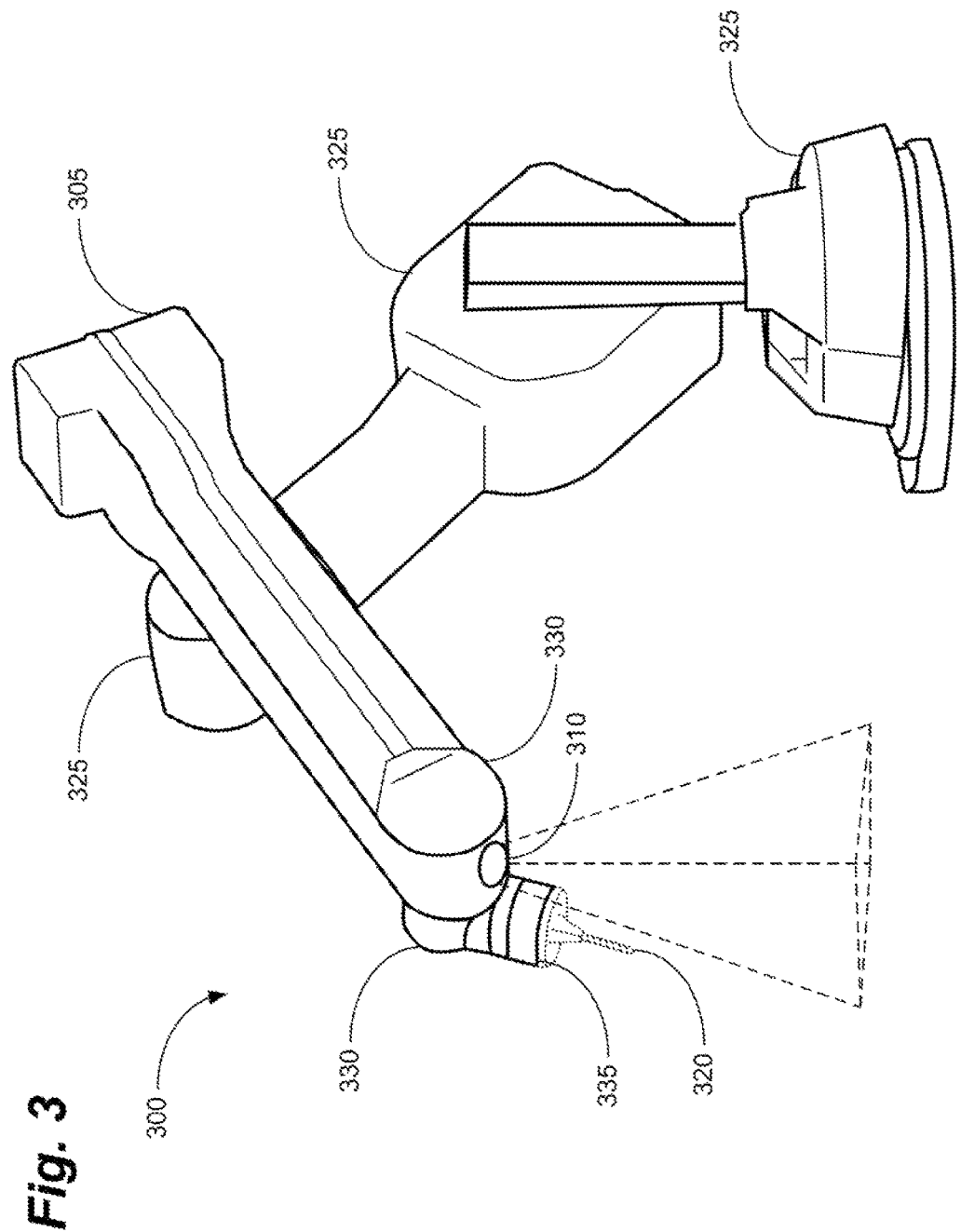
FIG. 3 depicts a robotic arm with a non-destructive imaging (NDI) device, in accordance with some embodiments of the present disclosure.

To this end, embodiments of the present invention relate to systems and methods for generating an accurate coordinate transformation for use with a robot, milling, or other machine, using surface and/or subsurface features. In some embodiments, as shown in FIG. 3, the system 300 can comprise a robot 305 (e.g., a robot, robotic arm, CNC controlled mill, etc.) with one or more NDI devices 310. In some embodiments, the robot 305 can comprise a robotic arm with one or more arm motors 325, for example, to precisely control the placement and movement of the arm, and one or more tool motors 330, to precisely control the placement of one or more machining devices 320. In some embodiments, the robot 305 can also comprise a robotic vehicle capable of moving around the object to be repaired (e.g., a wing panel or fuselage section).

The one or more NDI devices 310 can enable the robot 305 to scan the inside of a structure to locate subsurface reference points ("actual reference points"). These actual reference points can comprise, for example and not limitation, fasteners, compartments, components, intersections between subsurface structures (e.g., the intersection of a rib and a stringer), or the edges of components (e.g., the edge of a fuel tank). In other embodiments, the actual reference points can comprise ply drops on a composite structure (i.e., where the number and/or orientation of plies of composite material changes).

The NDI device(s) 330 can comprise a variety of surface penetrating scanners (i.e., as opposed to purely visual scanners such a video cameras). In some embodiments, the NDI device 310 can comprise, for example and not limitation, x-ray, infrared, eddy current, terahertz, microwave, interferometry, laser inspection, spectroscopy, thermography, or magnetic resonance imaging (MRI) technologies to enable the NDI device 310 to locate non-visual reference points 150 inside the structure of the aircraft (i.e., under the skin). In a preferred embodiment, the NDI device 310 can comprise an ultrasound imager such as, for example, an Olympus Omniscan ultrasound imager.

The robot 305 can also comprise a tool holder 335 for holding one or more machining devices 320 to enable the robot 305 to reshape, cut, sand, or mill the surface of the structure as necessary to manufacture parts, perform repairs, and fix defects, among other things. In some embodiments, the tool holder 335 can comprise a vacuum tool holder similar to those used on CNC milling machines. The machining devices 320 can comprise, for example and not limitation, one or more end mills, sanding discs, sanding belts, side mills, or drills.

As mentioned above, the robot 305 can comprise multiple arm and tool servo motors 325, 330, respectively, to enable the robot 305 to traverse and rotate the machining device 320 to machine various parts on the aircraft. Of course, the robot 305 could be used on other types of vehicles, or in other types of manufacturing, using similar, localizing features. In some embodiments, the robot 305 can have on board processing. In other embodiments, the robot 305 can be networked with one or more processors or computers that provide instructions.

In some embodiments, the system 300 can also comprise manufacturing data from, for example, engineering drawings, CAD files, or other sources (collectively, "CAD files"). The system 300 can use these CAD files to generate a synthetic NDI view including a plurality of reference points and other features. In other words, the system 300 can generate a view that "predicts" what the NDI device 310 will see during the actual scan of the aircraft for comparison. The synthetic NDI view can comprise intersections, surface curvatures, and other data that essentially comprise a 2D or 3D map of the object to be scanned. The system 300 can use the synthetic NDI view, compare it to the actual scan from the NDI device 310, and generate an accurate coordinate transformation from the machine coordinate system to, for example, the coordinate system of the aircraft. This can enable the system 300 to accurately locate itself with respect to the aircraft (or other vehicle) to perform machining, or other, processes. As discussed below, in other embodiments, the system 300 can also compare previous NDI scans to current NDI scans to locate or relocate itself. This may be useful, for example, when a machining operation needs to be stopped for some reason (e.g., to change a cutting bit) or to reposition the machine to continue an operation (e.g., from the inside of the aircraft to the outside).

As shown in FIGS. 4A-4D, embodiments of the present invention can also comprise a method 400 for generating an accurate coordinate transformation from the internal coordinate system of a machine to an absolute coordinate system (e.g., an aircraft's coordinate system). The method 400 can generally comprise generating a synthetic NDI view from CAD data, including virtual reference points 480, scanning a portion of the aircraft to generate an actual NDI view to locate a plurality of surface and/or subsurface features, or actual reference points 485, and comparing the synthetic NDI view to the actual NDI view to locate the machine in space. In some embodiments, this method 400 can be described in two subroutines 405, 450.

Figure 4A:
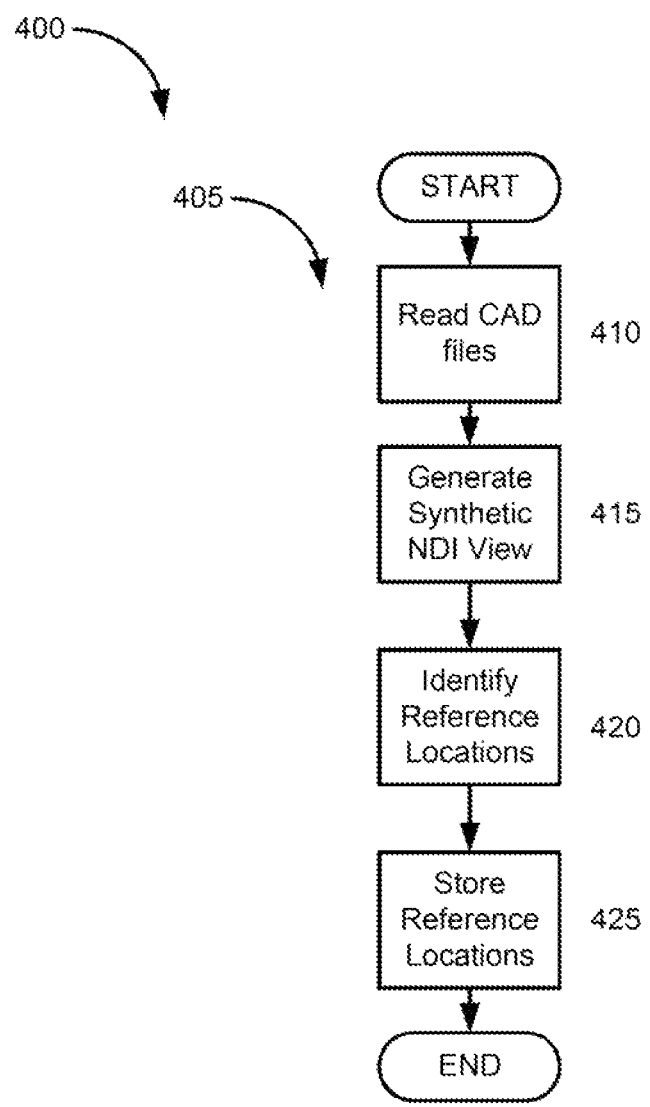
FIGS. 4A-4B depict a method for generating a coordinate transformation, in accordance with some embodiments of the present disclosure.

As shown in FIG. 4A, the first subroutine 405 can comprise generating a synthetic NDI view from existing engineering drawings (e.g., CAD files), previous scans, or other engineering data. As discussed above, the existing engineering definitions can comprise 2D and 3D CAD data, engineering drawings, or other available data. In some embodiments, therefore, the subroutine 405 can comprise reading and analyzing the existing CAD data, as shown at 410. Using this data, the subroutine 405 can generate a virtual NDI view using the existing engineering definitions, as shown at 415. As the name implies, the virtual NDI view can comprise a computer generated 2D or 3D projection of the object, based on the data from the CAD file(s). The synthetic NDI view can basically comprise a mathematical prediction, or model, of what the NDI device will see during the actual scan to enable the two views to be compared for location purposes.

In some embodiments, the synthetic NDI view can take into account what type of NDI device is used in the system. In other words, the synthetic NDI view can consider, for example and not limitation, certain materials that may be invisible to the NDI device or the penetration depth of the NDI device being used to accurately predict what the actual NDI scan, or view, will reveal. Thus, the synthetic NDI view may be different when using an x-ray NDI device as opposed to an ultrasound NDI device. In some embodiments, when multiple NDI devices are used, the synthetic NDI view can combine multiple predicted views to create an accurate prediction.

In some embodiments, using the CAD data, the subroutine 405 can also include calculating the location of local surface and subsurface features, or virtual reference points 480, based on the subsurface "texture" for use in generating the synthetic NDI view, as shown at 420. In other words, the subroutine 405 can identify intersections, ply drops, edges, and other subsurface features shown in the CAD files that can be used as virtual reference points 480 for comparison with actual reference points 485 from the NDI scan.

In some embodiments, texture features can be calculated using volumetric statistics to populate a "feature vector" for the virtual NDI view. In other words, the system can use technology similar to facial recognition to match unique surfaces, curves, and other features to generate a match even when there are no "visible" features. So, for example, the curvature of the wing in a particular location, or the intersecting curves at the root of the wing and the fuselage can provide locating features. These feature vectors can then be compared for similarity using 3D versions of known 2D techniques, as is known in the art. The subroutine 405 can then store 425 the synthetic NDI view, including virtual reference points 480, for use in the second subroutine 450.

Figure 4B:
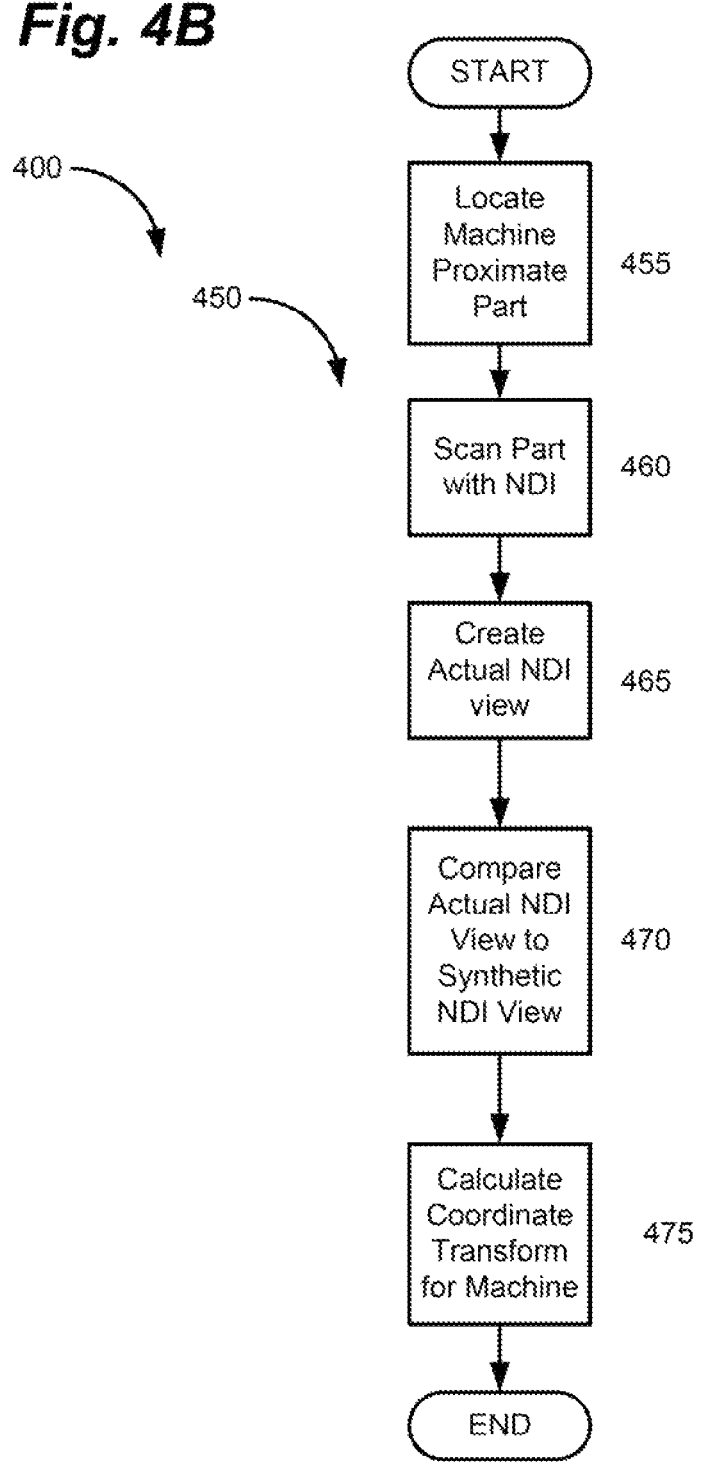
Figure 4C:
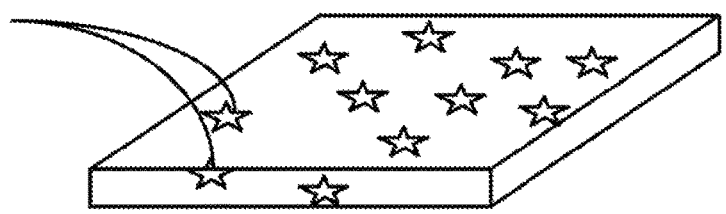
FIGS. 4C-4D are graphic depictions of the mapping process between virtual reference points and actual reference points, in accordance with some embodiments of the present disclosure.
Figure 4D:
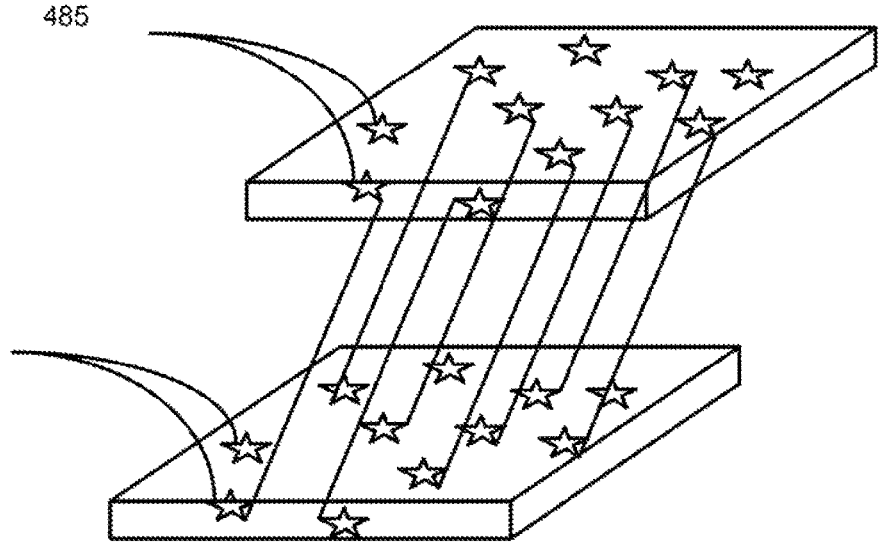

As shown in FIG. 4B, the second subroutine 450 can comprise placing 455 the machine (e.g., a robot, robotic machine, or CNC device) proximate the object or part. In some embodiments, the machine can be a mobile robot, for example, which can be steered to an appropriate location on the wing, ground, or fuselage to work on a particular component. In other embodiments, the machine can be a fixture, or other static machine, that can be placed 455 in approximately the correct location by a user (e.g., the estimated location for a repair).

Once in place, the machine can scan the surface and subsurface of the part with the NDI device, as shown at 460. The NDI device can scan for both expected and unexpected reference points. In other words, those reference points such as, for example, ply drops, intersections, and edges that are identified in the synthetic NDI view and the actual NDI view, or scan, can be used to compare and map the synthetic NDI view to the actual NDI view, as discussed below. Those reference points that are not expected, on the other hand, can be aircraft specific reference points and can include a variety of anomalies unique to the particular aircraft. These anomalies can comprise, for example and not limitation, previous repairs, voids, paint bubbles, and cracks.

In some embodiments, these anomalies may be marked for repair because, for example, they represent possible structural failure points. If a significant anomaly is found on a number of aircraft of the same type or brand, for example, the identification may initiate a campaign or recall program to rectify the problem prior to catastrophic failure. In other embodiments, the anomalies may be relatively harmless, but can nonetheless be used for more accurate location of equipment on that particular aircraft. The aircraft specific reference points can be stored using absolute coordinates, or coordinates relative to expected reference points. In some embodiments, the aircraft specific reference points can be stored for each aircraft based on tail number, or other identification, for future repair and/or service operations.

The method 450 can then use the scan data to generate an actual NDI view, as shown at 465. Like the synthetic NDI view, the actual NDI view can comprise a 2D or 3D representation of a portion of the aircraft, including contours, intersections, fasteners, and other actual reference points. Using this data, the system can then compare the synthetic NDI view, discussed above, with the actual NDI view to create a geometrical relationship between the two.

In some embodiments, the comparison can comprise locating and identify locations of subsurface reference points, or actual reference points 485, for use in determining its location and orientation. This can include, for example, comparing the virtual reference points 480 obtained from the CAD drawings, as shown at 415, and the actual reference points 485 obtained using NDI, as shown at 465. This process 470 is shown graphically in FIG. 4C (the identification of virtual reference points 480) and FIG. 4D (the mapping 470 of virtual reference points 480 and actual reference points 485). Of course, while the reference points 480, 485 are depicted as identical stars, in reality, each would be a unique intersection, curve, edge, or other feature. The system can then utilize this data to calculate a transformation from the machine coordinate system to an absolute coordinate system, e.g., the coordinate system of the aircraft or of the CAD data, as shown at 475. Thus, it is possible for this method 400 to accurately locate a machine or tool, for example, even on the relatively featureless surface of an aircraft wing.

Figure 4E:
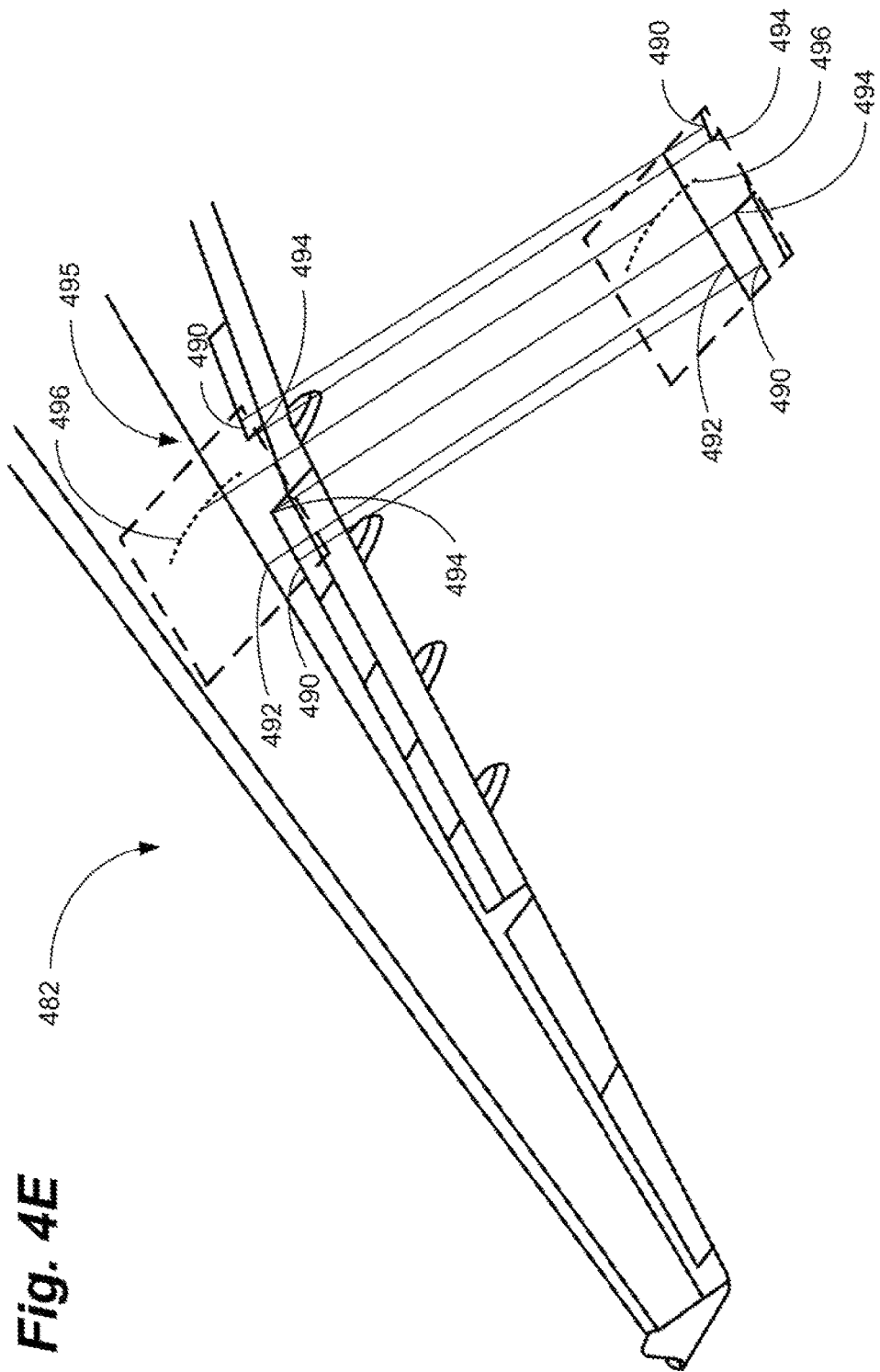
FIG. 4E is a graphic depiction of the mapping process between a synthetic NDI view and actual reference points, in accordance with some embodiments of the present disclosure.
Figure 5:
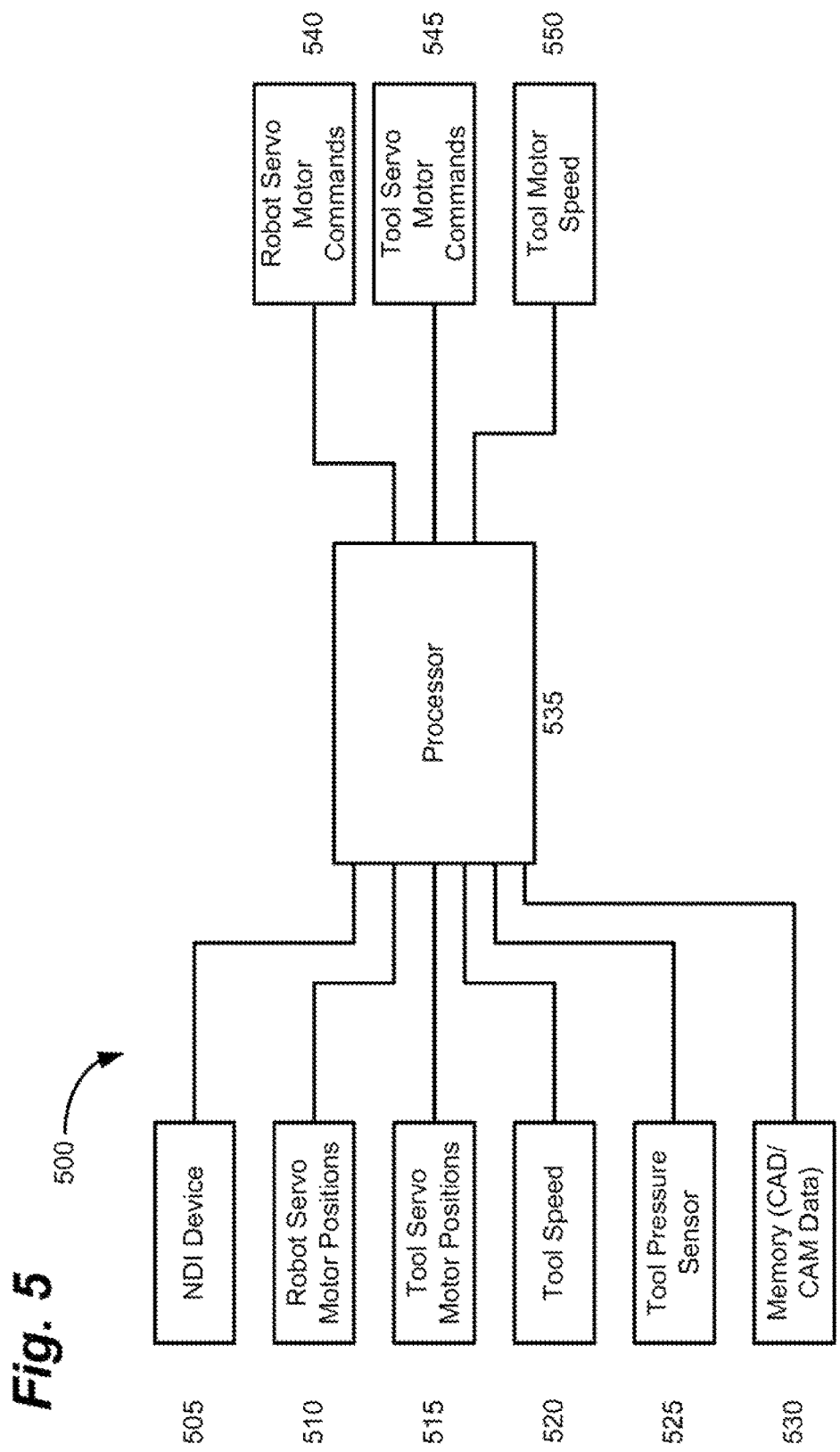
FIG. 5 depicts a system for generating a coordinate transformation, in accordance with some embodiments of the present disclosure.

As shown in FIG. 4E, in some embodiments, the system can generate a synthetic NDI view 482 for an entire aircraft, or a portion of an aircraft (e.g., an entire wing, as shown). The synthetic NDI view 482 can comprise the contours and surfaces of the wing, as well as a plurality of intersections, fasteners, holes, and components on both the surface and subsurface of the wing. The synthetic NDI view can contain hundreds, thousands, or even millions of data points, including virtual reference points 480, based on the size of the view, the complexity of the part, and other factors.

The actual NDI view 495, on the other hand, may tend to be more localized. This can be due to the field of view of the NDI device, the proximity of the machine to the surface of the aircraft, or the accuracy desired, among other things. The actual NDI view 495 can nonetheless identify a plurality of actual reference points 485. Even in a relatively small sample size, however, a relatively large number of actual reference points 485 can be identified. In some embodiments, the actual reference points can comprise, for example, surface curvatures 496 that can be matched due to their unique characteristics. In other embodiments, the actual reference points 485 can comprise corners or edges such as, for example, the corners 494 or edges 490 of flight control surfaces. In other embodiments, the actual reference points 485 can comprise surface or subsurface structural members or rows of fasteners 492 along the wing.

As a result, actual "features" are not necessary to identify and locate the system, but rather matching data sets, as in facial or music recognition software. In this manner, only matching "strings of data" are required to generate a match between the synthetic NDI view 482 and the actual NDI view 495. In some cases, for example, a single curve 496 can provide a sufficient number of matches to generate a coordinate transformation. Of course, in most cases, any three common reference points between the synthetic NDI view and the actual NDI view can be used to locate the machine and provide a coordinate transformation, with additional reference points increasing accuracy significantly.

Embodiments of the present invention can also comprise a system 500 for generating a coordinate transformation from an internal machine axis system to an absolute axis system (e.g., an aircraft or CAD axis system) using NDI to enable the machining, repair, and/or replacement of the part. In some embodiments, the system 500 can comprise a processor 535 for receiving various inputs and providing various outputs. The processor 535 can comprise, for example and not limitation, a microprocessor, a PC, an application specific integrated circuit (ASIC), or a field programmable gate array (FPGA).

One of the inputs to the processor 535 can comprise data from the NDI device 505. As mentioned above, the imaging device can comprise one or more imaging devices capable of scanning the interior of an object (e.g., penetrating the object) and locating two- or three-dimensional subsurface features. The processor 535 can use this information to determine its position relative to internal and/or external features of the object, to perform repairs and inspections, among other things.

In the case of a robotic machine (e.g., a robotic arm 300), the processor 535 can also receive inputs from the robotic arms servo positioning motor(s) 510. This can provide the processor 535 with information about the position and movement of the robotic arm itself. Similarly, the processor can also receive inputs from the servo positioning motor(s) for the tool holder 515. In some embodiments, the processor 535 may also receive inputs from other sensors related to the tool holder such as, for example and not limitation, a tool speed sensor (e.g., RPM sensor) 520 and a tool pressure sensor 525. These sensors 520, 525 can be used to modulate tool speed and reduce breakage and wear and tear by detecting when the tool is being traversed too quickly or when the tool is cutting particularly hard material, for example. Of course, other sensors such as, for example, tool and motor temperature sensors could also be used and are contemplated herein.

In some embodiments, the system 500 can also receive inputs from the NDI device 50. The system 500 can also receive inputs from a memory 530, which can include CAD files. In some embodiments, the memory can include many types of volatile and non-volatile memory. The processor 535 can use the CAD files to generate a synthetic NDI view of the aircraft, including a plurality of virtual reference points. The system 500 can the compare the synthetic NDI view to the actual NDI view provided by the NDI device to calculate a coordinate transformation. In some embodiments, this comparison can comprise matching a plurality of actual reference points located with the NDI device 505 in the actual NDI view to virtual reference points from the CAD data 530 in the synthetic NDI view to determine the machine's position in space relative to the part.

The processor 535 can then either calculate or receive tool path information from a networked computer and provide commands (e.g., pulse width modulation, or PWM) to the robot's positioning motor(s) 540, tool holder positioning motor(s) 545, and tool drive motor 550 to machine, drill, scarf, or otherwise work on the object.

Embodiments of the present disclosure can also comprise a method 600 for locating or relocating a machine or robot by comparing two or more actual NDI scans. As mentioned above, NDI scans are capable of locating not only the aforementioned expected reference points, or reference points that are detailed in CAD drawings, but also surface and subsurface anomalies that can be used to further locate the machine in space on a particular aircraft. In other words, in addition to the expected reference points, which can comprise edges, ply drops, intersections, etc., the NDI device can also detect unexpected reference points such as, for example and not limitation, bubbles, voids, cracks, repairs, and other surface and subsurface anomalies to further increase placement accuracy on a particular aircraft.

This can be useful, for example, when drilling a hole through the fuselage of an aircraft. In other words, it may not be possible, or desirable, to drill the entire hole from one side. It may instead, be preferable to drill a portion of the hole from the outside and the remainder of the hole from the inside. Obviously, significant accuracy is required to move the drilling apparatus from the outside of the aircraft to the inside of the aircraft so that the two portions of the hole line up. This can also be useful when a machining operation is interrupted, for example, to change a bit, perform other machine repairs or maintenance, or when the machine must be repositioned for technical reasons (e.g., access, thickness, or other technical issues).

This can also be useful, for example, when repairing a section of a composite surface. These repairs often require milling the composite surface to remove defects. Once the defect has been removed, additional material must often be removed to provide adequate taper between the surface being repaired and the existing surface of the aircraft. This may be for aerodynamic reasons to immunize airflow disturbances proximate the repair, for example, or for structural reasons to prevent stress risers and cracks proximate the repair, among other things. It can be useful, however, to achieve the necessary taper by having a first portion of the repair on the inside of the surface and a second portion of the repair on the outside of the surface. In this manner, the overall area required for the repair can be reduced significantly when compared to a repaired performed from only one side. Obviously, this requires accurate placement of machining equipment on the inside and the outside of the surface to provide an effective repair.

To this end, the method 600 can start by scanning a first portion of the aircraft with the NDI device in a first position, as shown at 605. The method 600 can utilize the data from the first scan to generate a first actual NDI view for the first position, as shown at 610. The first actual NDI view can locate various engineering features such as, for example and not limitation, structural elements, fasteners, edges of elements, intersections of elements, and ply drops. In addition, the first actual NDI view can also comprise aircraft specific anomalies such as, for example, former repairs, voids, and cracks. In some embodiments, the first NDI view can be generated after a first portion of a repair or operation has been completed. In this manner, the aircraft specific anomalies can also comprise one or more holes, cuts, or other operations performed by the machine while in the first position (e.g., the machine can use the holes it drilled in the first portion of an operation to locate the machine for the second portion of the operation). The combination of engineering features and aircraft specific features can generate a first actual NDI view with hundreds or thousands of locating points, creating significant accuracy.

The method 600 can continue by moving the machine from a first position to a second position, as shown at 615. This can include, for example, physically moving the machine from one place to another (e.g., from the outside of the fuselage to the inside), moving the arm of the machine, or removing a portion of the aircraft structure (e.g., removing a top layer to machine a bottom later). This may be necessary, for example, to complete a machining operation from the other side of the object (e.g., the area is too thick for a single pass with a tool), to provide access, or to complete a multiphase repair.

The method 600 can continue by scanning a second portion of the aircraft in the second position, as shown at 620. The system can then generate a second actual NDI view using the data from the second scan, as shown at 625. The second actual NDI view 615 can be, for example and not limitation, from a shifted location with some overlap with the first location (FIG. 7A), the reverse side of the first location (FIG. 7B), or the same location, but from a different distance (FIG. 7C).

Figure 7A:
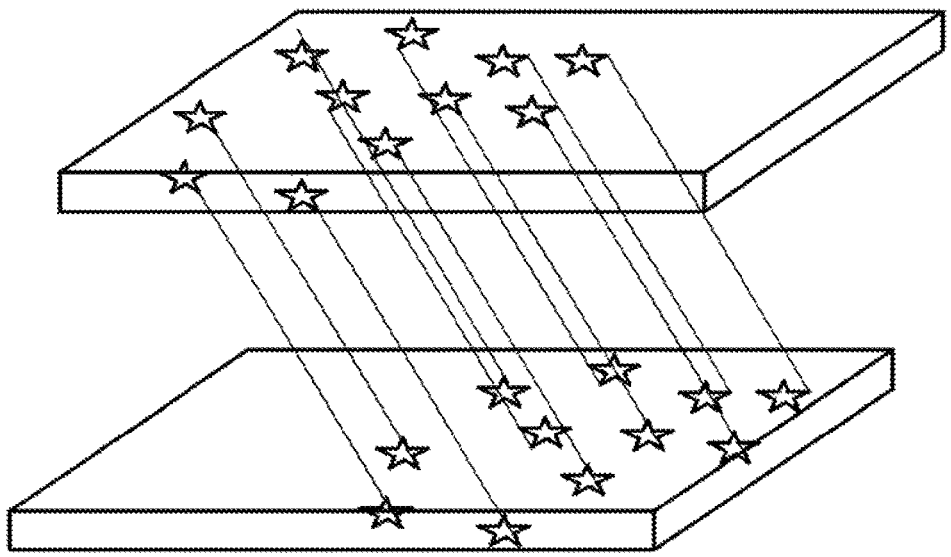
FIGS. 7A-7C depict mapping between a first NDI view and a second NDI view to create a coordinate transformation, in accordance with some embodiments of the present disclosure.
Figure 7B:
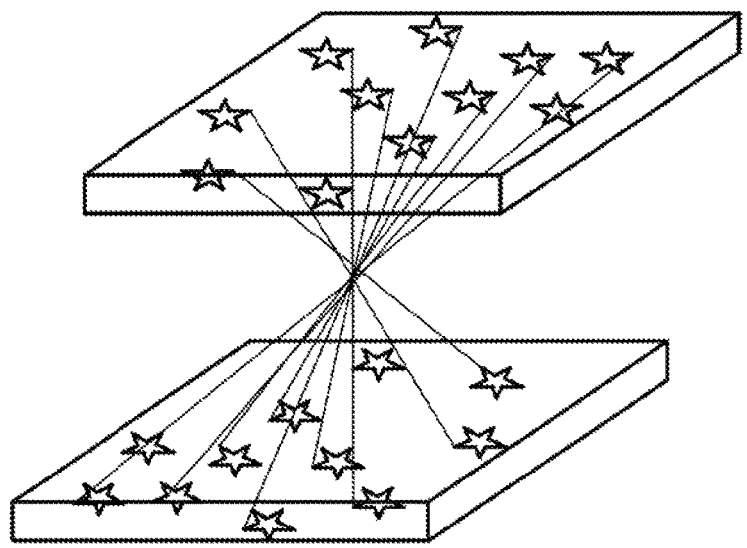
Figure 7C:
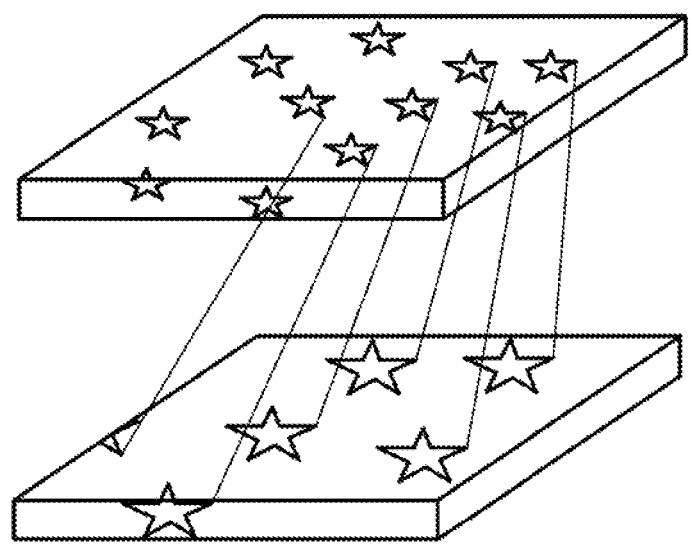

So, for example, if the second NDI view is taken from the same general location from the first NDI view, but slightly shifted, as shown in FIG. 7A, the system can translate the coordinate system to accommodate the shift. If, on the other hand, the second NDI scan is taken from the same location as the first NDI scan, but from the inside of the fuselage instead of the outside, it will be substantially a mirror image of the first NDI view. This can enable the system to essentially reverse the first coordinate transformation from the first NDI view to generate a second coordinate transformation for the second NDI view, as shown in FIG. 7B. Similarly, if the second NDI view is taken from the same area, but at a different distance or zoom level, the system can identify the remaining common points in the two views to update the transformation for the new distance.

The method 600 can then compare the first actual NDI view to the second actual NDI view, as shown at 630. The method 600 can then determine if there is sufficient overlap between the first actual NDI view to the second actual NDI view to make an accurate coordinate transformation modification, as shown at 635. If there are a sufficient number of overlapping features, the method 600 can continue by generating a second coordinate transformation for the machine in the second position using the geometrical relationships between the features, as shown at 640. As mentioned above, this can comprise, for example and not limitation, a shift (or translation), a rotation or reversal, or a change in distance (e.g., closer or farther from the aircraft). The machine can then continue working in the second location using the second coordinate transformation.

If, on the other hand, there is insufficient overlap from the first actual NDI view to the second actual NDI view, the system can defer to the method 400 discussed above and shown in FIGS. 4A-4B. In some embodiments, this may be because there is no, or insufficient overlap from the first actual NDI view to the second actual NDI view. This can occur when, for example and not limitation, the machine is moved a sufficient distance that it is outside the view of the first actual NDI view, the first actual NDI view and the second actual NDI view are be separated by an impenetrable substrate, or the first actual NDI view and the second actual NDI view are separated by a distance outside the penetration depth of the NDI device (e.g., at the root of the wing).

In some embodiments, aircraft specific NDI scans can be stored for future use. This can enable a fixed base operator (FBO) or other maintenance facility to repair aircraft with increased accuracy and decreased repair time and cost. The use of NDI scans across a fleet of planes can also be used to identify manufacturing defects in a particular type of aircraft, possibly saving lives. If, for example, a void is detected in most, or all, of the wings of a particular aircraft during service, a proactive repair schedule can be devised to correct the issue prior to structural failure.

While several possible embodiments are disclosed above, embodiments of the present disclosure are not so limited. For instance, while a computer controlled robotic arm has been disclosed, other suitable machines, such as a mobile robotic vehicle or a stationary milling machine, for example, could be selected without departing from the spirit of the disclosure. In addition, the location and configuration used for various features of embodiments of the present disclosure such as, for example, the location of motors, sensors, the order of operations, and other factors can be varied according to a particular aircraft or application that requires a slight variation due to, for example, the size or construction of the aircraft, the type of robot or tooling required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for generating a coordinate transformation comprising:
analyzing one or more computer aided design (CAD) files for an object;
generating a synthetic non-destructive imaging (NDI) view of the object based on the CAD files, wherein generating the synthetic NDI view of the object comprises identifying one or more virtual reference points on the object in the one or more CAD files;

scanning one or more of a surface and a subsurface of the object with an NDI device;

generating an actual NDI view of the object based on the NDI scan, wherein generating the actual NDI view of the object comprises identifying one or more actual reference points on the object;

comparing the synthetic NDI view to the actual NDI view; and generating the coordinate transformation from a machine coordinate system to an absolute coordinate system based on the comparison.

2. The method of claim 1, wherein comparing the synthetic NDI view to the actual NDI view comprises mapping one or more virtual reference points to one or more actual reference points.

3. The method of claim 1, wherein locating the one or more actual reference points comprises locating one or more intersections of structural components in the subsurface of the object with the NDI device.

4. The method of claim 3, wherein locating one or more intersections of structural components comprises locating the intersections of one or more of stringers, spars, ribs, frame rails, and mounting points.

5. The method of claim 3, wherein locating one or more intersections of structural components comprises locating an intersection between one or more stringers, ribs, and spars of an aircraft.

6. The method of claim 1, wherein locating one or more actual reference points comprises locating one or more edges of components in the subsurface of the object with the NDI device.

7. The method of claim 6, wherein locating the one or more edges of components in the subsurface of the object comprises locating one or more edges of one or more of fuel tanks.

8. The method of claim 6, wherein locating the one or more edges of components comprises locating one or more edges of one or more composite ply drops.

9. A method for generating a coordinate transformation comprising:

generating a synthetic non-destructive imaging (NDI) view from one or more computer aided design (CAD) files describing an object;

determining a location of one or more virtual reference points within the synthetic NDI view with a processor;

scanning one or more of a surface and a subsurface of the object with an NDI device to obtain NDI data describing the object;

generating an actual NDI view of the object based on the NDI data;

determining a location of one or more actual reference points in the actual NDI view;

comparing the synthetic NDI view to the actual NDI view with the processor; and calculating the coordinate transformation from a machine coordinate system to an absolute coordinate system with the processor based on the comparison.

10. The method of claim 9, wherein comparing the synthetic NDI view to the actual NDI view comprises mapping a first subset of the one or more virtual reference points from the synthetic NDI view to second subset of one or more actual reference points in the actual NDI view; and calculating the coordinate transformation comprises determining the geometrical relationship between the first subset of one or more virtual reference points and the second subset of one or more actual reference points.

11. The method of claim 9, wherein comparing the synthetic NDI view to the actual NDI view comprising comparing at least three virtual reference points to at least three actual reference points.

12. The method of claim 9, wherein calculating the coordinate transformation from the machine coordinate system to the absolute coordinate system comprises:

calculating the coordinate transformation from the machine coordinate system to an aircraft coordinate system.

13. The method of claim 9, wherein locating the one or more virtual reference points comprises identifying one or more intersections of structural components in the one or more CAD files for the object; and wherein locating the one or more actual reference points comprises identifying one or more intersections of structural components in the object with the NDI device.

14. The method of claim 13, wherein determining the location of one or more virtual reference points comprises locating one or more intersections between one or more of stringers, ribs, and spars in the synthetic NDI view of an aircraft; and determining the location of the one or more actual reference points comprises locating an intersection between one or more stringers, ribs, and spars in a subsurface of the aircraft in the actual NDI view.

15. The method of claim 13, wherein identifying the intersection of one or more structural components comprises locating the intersection of one or more stringers, spars, ribs, frame rails, and mounting points.

16. The method of claim 9, wherein locating the one or more virtual reference points comprises identifying one or more one or more edges of components in the one or more CAD files for the object; and wherein locating one or more actual reference points comprises identifying one or more edges of components in the subsurface of the object with the NDI device.

17. The method of claim 16, wherein identifying the one or more edges of components comprises identifying the edges of one or more of fuel tanks.

18. The method of claim 16, wherein identifying the one or more edges of components comprises identifying the edges one or more composite ply drops.

19. The method of claim 9, further comprising:

performing one or more machining operations on the object using the coordinate transformation.

20. A system for generating a coordinate transformation comprising:

a robotic arm comprising: one or more arm motors for positioning the robotic arm;

one or more tool motors for positioning a tool holder on the robotic arm; and one or more machining devices for machining an object; and a first non-destructive imaging (NDI) device to generate an actual NDI view of the object comprising one or more actual reference points; and a processor that receives input from the NDI device and from a memory that includes one or more computer aided design (CAD) files for the object, the processor using the CAD files to generate a synthetic NDI view of the object comprising one or more virtual reference points, the processor comparing the actual NDI view and the synthetic NDI view to calculate the coordinate transformation from a machine coordinate system to an absolute coordinate system;

wherein the robotic arm performs one or more machining operations on the object using the one or more machining devices and the coordinate transformation.

21. The system of claim 20, wherein the one or more virtual reference points, the one or more actual reference points, or both comprise one or more stringers, spars, ribs, frame rails, and mounting points.

22. The system of claim 20, wherein the one or more virtual reference points, the one or more actual reference points, or both comprise one or more edges of one or more fuel tanks.

23. The system of claim 20, wherein the one or more virtual reference points, the one or more actual reference points, or both comprise one or more composite ply drops.

24. A method for creating a second coordinate transformation based on a first coordinate transformation comprising:

scanning one or more of a surface and a subsurface of an object with a non-destructive imaging (NDI) device in a first position for which the first coordinate transformation is known;

generating a first NDI view of the object based on the NDI scan in the first position;

scanning one or more of the surface and the subsurface of the object with the NDI device in a second position;

generating a second NDI view of the object based on the NDI scan in the second position;

comparing the first NDI view to the second NDI view; and generating the second coordinate transformation based on the comparison of the first NDI view to the second NDI view and the first coordinate transformation.

25. The method of claim 24, wherein the NDI scan in the first position comprises a first set of one or more actual reference points;

wherein the NDI scan in the second position comprises a second set of one or more actual reference points; and wherein comparing the first NDI view to the second NDI view comprises mapping at least one actual reference point that is common to the first set of one or more actual reference points and the second set of one or more actual reference points.

26. The method of claim 25, wherein comparing the first NDI view to the second NDI view comprises mapping at least three actual reference points that are common to the first set of one or more actual reference points and the second set of one or more actual reference points.

27. The method of claim 25, wherein generating the second coordinate transformation based on the comparison of the first NDI view to the second NDI view and the first coordinate transformation comprises generating a second coordinate transformation from a machine coordinate system to an absolute coordinate system.

28. A method for creating a coordinate transformation comprising:

analyzing one or more computer aided design (CAD) files for an object;

generating a synthetic non-destructive imaging (NDI) view of the object based on the CAD files;

scanning one or more of a surface and a subsurface of the object with an NDI device in a first position;

generating a first NDI view of the object based on the NDI scan in the first position;

comparing the synthetic NDI view to the first NDI view;

generating a first coordinate transformation from a machine coordinate system to an absolute coordinate system based on the comparison of the synthetic NDI view to the first NDI view;

scanning one or more of the surface and the subsurface of the object with the NDI device in a second position;

generating a second NDI view of the object based on the NDI scan in the second position;

comparing the first NDI view to the second NDI view; and generating a second coordinate transformation based on the comparison of the first NDI view to the second NDI view.

29. The method of claim 28, wherein scanning one or more of the surface and the subsurface of the object with an NDI device in the first position comprises scanning the object from an inside position;

wherein scanning one or more of the surface and the subsurface of the object with an NDI device in the second position comprises scanning the object from an outside position; and wherein the second coordinate transformation is substantially an inverse of the first coordinate transformation.

30. A method for creating a coordinate transformation comprising:

analyzing one or more computer aided design (CAD) files for an object;

generating a synthetic non-destructive imaging (NDI) view of the object based on the CAD files;

positioning a machine on the object in a first position;

scanning one or more of a surface and a subsurface of the object with an NDI device in the first position;

generating a first NDI view of the object based on the NDI scan in the first position;

comparing the synthetic NDI view to the first NDI view;

generating a first coordinate transformation from a machine coordinate system to an absolute coordinate system based on the comparison of the synthetic NDI view to the first NDI view;

positioning the machine on the object in a second position;

scanning one or more of the surface and the subsurface of the object with the NDI device in the second position;

generating a second NDI view of the object based on the NDI scan in the second position;

comparing the first NDI view to the second NDI view; and generating a second coordinate transformation from the machine coordinate system to the absolute coordinate system based on the comparison of the first NDI view to the second NDI view.

31. The method of claim 30, further comprising:

performing a first portion of an operation on the object in the first position with the machine; and performing a second portion of the operation on the object in the second position with the machine;

wherein the first coordinate transformation relates to the first portion of the operation; and wherein the second coordinate transformation relates to the second portion of the operation.

32. The method of claim 31, wherein performing the first portion of the operation comprises performing the first portion of the operation from an outside location on the object;

wherein performing the second portion of the operation comprises performing the second portion of the operation from an inside location on the object; and wherein the second coordinate transformation is substantially an inverse of the first coordinate transformation.

33. The method of claim 32, wherein performing the first portion of the operation comprises drilling a first portion of a hole;
  wherein the performing the second portion of the operation comprises drilling a second portion of the hole; and
  wherein the first coordinate transformation and the second coordinate transformation align the first portion of the hole and the second portion of the hole to form a single hole from the inside location to the outside location of the object.

34. The method of claim 33, wherein performing the first portion of the operation comprises milling a first portion of an outside surface of the object; and
  wherein performing the second portion of the operation comprises milling a second portion of an inside surface of the object;
  wherein coordinating the first portion of the operation and the second portion of the operation comprises aligning the first portion and the second portion.

35. The method of claim 34, wherein the operation comprises a composite repair; and
  wherein performing the first portion from the outside surface and the second portion from the inside surface reduces a surface area required to taper the composite repair when compared to a repair from the outside surface only.

36. The method of claim 30, wherein positioning the machine on the object in the first position comprises placing the machine on the object in the first position; and
  wherein positioning the machine on the object in the second position comprises placing the machine on the object in the second position.

37. The method of claim 30, wherein positioning the machine on the object in the first position comprises moving an arm on the machine to the first position; and
  wherein positioning the machine on the object in the second position comprises moving the arm on the machine to the second position.

* * * * *